United States Patent Office 3,481,913
Patented Dec. 2, 1969

3,481,913
PROCESS FOR PREPARING HARD WAXES
Josef Kaupp, Wiesbaden, and Karl Petz, Gersthofen, Germany, assignors to Farbwerke Hoechst Aktiengesellschaft vormals Meister Lucius & Bruning, Frankfurt am Main, Germany, a corporation of Germany
No Drawing. Filed Aug. 2, 1966, Ser. No. 569,601
Claims priority, application Germany, Aug. 28, 1965, F 47,030
Int. Cl. C08f 15/16
U.S. Cl. 260—89.5          3 Claims

ABSTRACT OF THE DISCLOSURE

A process for preparing an alkyl acrylate monomer by ester interchange and polymerization of the monomer to obtain a hard wax; by contacting about stoichiometric amounts of an acrylic acid ester of a 1–4 carbon alcohol with an aliphatic alcohol of 16–30 carbon atoms in the presence of a reducing acid or its corresponding salt; and an inorganic polymerization inhibitor, and thereafter converting the resulting monomer to the desired hard wax by catalyzed polymerization reaction.

---

The present invention relates to a process for preparing hard waxes. The preparation of alkyl acrylates having high molecular weight alkyl groups is known. The polymerisation of these acrylates into wax-like products is known, too. The known methods for preparing the acrylates to be used—ester interchange reaction of low molecular weight alkyl acrylates with higher alcohols and following high vacuum distillation for separating primary polymers and dark-coloured by-products—are complicated and, as to the yields, only little satisfying. Hexadecylacrylate is obtained, for example, with a yield of 63% of the theory, whereas with acrylates having alkyl groups of higher molecular weight the yields often decrease to a few percent. Hitherto, alkyl acrylates having alkyl groups of high molecular weight have been polymerised according to the emulsion process. However, for preparing waxes this process is unsuitable, for waxes are mostly processed in organic solvents, and therefore the polymers must be first isolated and dried.

It has now been found that hard waxes can be prepared in an advantageous manner from alkyl acrylates when acrylic esters of alcohols of low molecular weight are subjected to an ester interchange reaction with aliphatic alcohols having 10 to 30 carbon atoms, in the presence of reducing acids or the salts thereof and of an inorganic polymerisation inhibitor, and the reaction product is polymerised in known manner.

For ester interchange there are suited acrylic acid esters of low alcohols having an alkyl group of 1 to 4 carbon atoms, preferably acrylic acid methyl ester. The aliphatic alcohols suitable for the reaction have 16–30, especially 16–24 carbon atoms. There may be used, for instance, the cetyl, stearyl and behenyl alcohols as well as mixtures thereof, furthermore synthesis alcohols obtained, for example, by saponification and oxidation of reaction products from alumium triethyl with ethylene. For ester interchange, there are used for 1 mol of alcohol 2–8, preferably 3–5 mols of the acrylic acid ester of alcohols having 1–4 carbon atoms.

As reducing agents may be used, for instance, sulfurous acid, hydro-sulfurous acid, the sodium salt of the hydroxymethanesulfonic acid, and preferably hypophosphorous acid. The reducing agents may also be employed as aqueous solution, e.g. hypophosphorous acid as a solution of 50% strength. It is useful to add the reducing agents to the reaction mixture in concentrations from 0.01–1%, preferably from 0.1–0.5%.

As inorganic polymerisation inhibitors there are suited, for instance, copper-I-chloride and copper-I-acetate. They are used in quantities from 0.01–1%, especially from 0.1–0.5%, calculated on the alcohol.

In general, the ester interchange reaction is performed in an excess of the alkyl acrylate of low molecular weight; however, it is also possible to work in the presence of additional solvents or diluents, for instance, hydrocarbons or chlorinated hydrocarbons. Furthermore, there may be added sulfuric acid or p-toluene-sulfo-acid in quantities from 0.01–1%. The reaction temperature should be in the range of from 50 to 150° C., preferably from 60 to 90° C. It is possible to work under atmospheric, reduced or increased pressure.

After the reaction the excess of acrylic ester, the additional solvent, if any, as well as the low molecular weight alcohol set free during the ester interchange, are distilled off. Then the reaction product may be filtered in order to remove the inorganic polymerisation inhibitor.

The alkyl acrylates obtained as crude products according to the claimed process are of a bright colour and may be employed directly for polymerization.

The polymerisation of the crude alkyl acrylates is performed in substance. As catalysts there are suited compounds forming radicals, for instance, dibenzoyl peroxide, di-tert.butyl peroxide or azoisobutyronitrile. The catalysts are added to the acrylates in quantities of 0.01–3% by weight, preferably 0.1–1.5% by weight; but also higher concentrations have no influence whatever on the polymerisation. Rays rich in energy, e.g. ultra-violet light, are likewise suitable for initiating the polymerisation.

The success of polymerisation does not depend upon the manner in which a catalyst is added to the monomer. The total quantity of catalyst may be added at the beginning of the polymerisation; but it is also possible to start the polymerisation process by adding a partial quantity of the catalyst and the rest later on in portions during the polymerisation. It is also possible to introduce further amounts of acrylate into the polymerisation mixture.

Polymerisation takes place at temperatures between 50 and 250° C., preferably between 80–170° C. As the reaction is highly exothermic, it is, in general, necessary to cool the reaction vessel during the whole polymerisation process. It is, however, not necessary to work at a constant temperature; on the contrary, it proved suitable to start polymerisation at 100° C. and to permit an increase of the temperature up to 150–180° C. in the course of reaction. The polymerisation may be performed under atmospheric, reduced or increased pressure.

The hard waxes manufactured from the acrylates in conformity with the process, are polymers with polymerisation degrees from 3 to 20, preferably from 3–10 and have a bright colour. They may be employed in many fields, for instance as floor polishes, furniture polishes and motor-car waxes, as well as in paper and plastics industries.

The following examples serve to illustrate the invention but they are not intended to limit it thereto.

EXAMPLE 1

4.05 g. of technical grade stearyl alcohol (95% strength), 516.5 g. of acrylic acid methyl ester, 1 g. of copper-I-chloride, 3 g. of aqueous hypophosphorous acid of 50% strength and 5 g. of sulfuric acid were stirred and heated up to 73–75° C. in a flask holding 2 litres. Then an azeotropic mixture of methanol and acrylic acid methyl ester was distilled off during 2½ hours and at a distillation temperature of 60–65° C. Further methyl acrylate, added in excess, was drawn off in the water jet vacuum and the reaction product was then filtered.

The stearyl acrylate had a bright colour, the yield was 100%, calculated on the used stearyl alcohol. The characteristic properties of the crude stearyl acrylate were: hydroxy number 8.9; saponification number 182; acid number 13.3; flow point/drop point 44.2/44.5° C. The crude product was used directly for polymerisation.

The polymerisation of the stearyl acrylate was effected with vigorous stirring at 100° C. in the presence of 1% of dibenzoyl peroxide. During this reaction the temperature rose to 160° C. within 2 minutes. After cooling to about 70° C., the polymer was poured into a dish. It was a bright and hard wax having a flow point/drop point of 49/49.4° C.

EXAMPLE 2

489 g. of technical grade behenyl alcohol (about 95% strength), 516.5 g. of acrylic acid methyl ester, 5. g. of aqueous hypophosphorous acid of 50% strength, 3 g. of copper-I-chloride and 5 g. of sulfuric acid were reacted as described in Example 1 to obtain behenyl acrylate. The bright behenyl acrylate had the following characteristic properties: hydroxyl number 8.5; saponification number 159; acid number 7.4 and flow point/drop point 61.2/61.4° C. The yield of crude product amounted to 100%, calculated on used behenyl alcohol. It was employed directly for polymerisation. As in Example 1, for polymerisation 1% of dibenzoyl peroxide was added to the monomer. The catalyst was added at a temperature of 105° C. Despite water cooling, the temperature rose to 150° C. during polymerisation. The polymer, a bright hard wax, had a flow point/drop point of 67/67.2° C.

What is claimed is:
1. A process for producing hard waxes comprising contacting about a stoichiometric amount of
   (A) an acrylic acid ester of an alcohol having 1–4 carbon atoms and
   (B) an aliphatic alcohol of 10–30 carbon atoms in the presence of
   (C) about .01–1.5% by weight of a reducing acid selected from the group consisting of sulfurous acid, hydrosulfurous acid, the sodium salt of hydroxymethane sulfonic acid and hypophosphorous acid,
   (D) an inorganic polymerisation inhibitor to effect ester interchange of (A) and (B), effecting the ester interchange at about 50–150° C. and polymerising the resulting exchange product at about 50–250° C. in the presence of a radical-forming polymerisation catalyst or light ray rich in energy.

2. The process of claim 1 wherein is added as polymerisation inhibitor about .1–.5% based on the alcohol of a member selected from the group consisting of copper-I-chloride and copper-I-acetate.

3. The process of claim 1 wherein the (A) component is the methyl ester of acrylic acid and the (B) component is an alcohol selected from the group consisting of cetyl, stearyl, and behenyl.

References Cited

UNITED STATES PATENTS

| | | | |
|---|---|---|---|
| 2,129,662 | 9/1938 | Barrett et al. | 260—486 |
| 2,143,941 | 1/1939 | Crawford | 260—89.5 |
| 2,891,990 | 6/1959 | Mulvany et al. | 260—486 |
| 3,014,065 | 12/1961 | Chatelin et al. | 260—486 |
| 3,293,283 | 12/1966 | Dobson et al. | 260—486 |

HARRY WONG, JR., Primary Examiner

U.S. Cl. X.R.

204—159.22; 260—86.1, 486